Aug. 2, 1949.    M. H. ROSKE    2,478,057
MACHINE FOR INSERTING AND FASTENING IN SHOE UPPERS
INDIVIDUAL THERMOPLASTIC LACING ELEMENTS
Filed Nov. 21, 1944    7 Sheets-Sheet 1

Witness
Frederick S. Greenleaf

Inventor
Milton H. Roske
by his Attorney
Maxwell Fish

Patented Aug. 2, 1949

2,478,057

UNITED STATES PATENT OFFICE 2,478,057

MACHINE FOR INSERTING AND FASTENING IN SHOE UPPERS INDIVIDUAL THERMOPLASTIC LACING ELEMENTS

Milton H. Roske, Malden, Mass., assignor to United Shoe Machinery Corporation, Flemington, N. J., a corporation of New Jersey Application November 21, 1944, Serial No. 564,467

16 Claims. (Cl. 12—69.5)

The present invention relates to improvements in the manufacture of shoes, and more particularly to the lacing of the eyeletted shoe upper preparatory to the assembly of the upper with other shoe parts on the last.

It is an object of the invention to provide a novel and improved shoe upper lacing which is well adapted for holding firmly together the margins of the eyelet slit for supporting the upper in its proper position on the last.

In accordance with this object, a feature of the invention consists in the provision of a lacing in the form of a series of endless bands of thermoplastic material which connect oppositely disposed eyelets in the upper, each such band consisting of a length of organic material having latent adhesive qualities so that the ends may be connected together by activation of the material to form a continuous integral band for lasting purposes. The material employed is an organic thermo-plastic material well adapted to provide endless lacing bands which are of predetermined length, readily conformable to the position of the upper on the last, and of such quality and texture as to avoid any possibility of injury to or marring of the upper as a result of handling or of stretching the upper over the last.

It is another object of the invention to provide a novel method of lacing eyeletted shoe uppers to form the lacing above described. Applicant's method consists in employing strips of a tough, deformable organic thermo-plastic material which are inserted through the eyelets of the respective pairs, and which are then formed into endless bands by closing and by fusing together the strip ends.

It is a further object of the invention to provide a novel machine which is well adapted for the handling and control of the strips of deformable organic thermo-plastic material to provide for the insertion of the lacings through the individual eyelet pairs, and for bringing together and fusing the ends of the strips to form continuous unitary bands of integral material.

The machine provided in accordance with the present invention, consists generally of a base, a work table upon which lacing strip portions are located with the ends bent upwardly to permit the eyelets of the shoe upper to be impaled thereon, a feeding mechanism for feeding the lacing strips to the work table, means for severing the individual lacing strip portions from the supply, a bending and clamping device for bending to a U shape and for supporting the individual strip portions in position for the impaling of the eyelet pairs thereon, and mechanism for closing and for sealing the ends of the strip portions together to form the individual lacing bands.

The several features of applicant's improved shoe upper lacing, the novel method of lacing the eyeletted shoe upper to provide the lacing herein described, and the features of the machine employed for inserting this lacing in accordance with applicant's method, will be readily understood by one skilled in the art from the following description taken in connection with the accompanying drawings, in which.

Before the conventional shoe upper can be fitted and properly stretched over a last, some means must be provided for securing and for holding firmly together the edges of the eyelet slit. The fastening means employed is usually of a temporary nature, and in accordance with current practice comprises lacing cord which is passed through the eyelets of the pairs manually or by machine and the ends knotted together. This operation as now performed has been found to have disadvantages for use in connection with the shoe manufacturing process, in that the lacing operation is a time consuming and expensive operation, and further in that considerable difficulty is encountered in insuring uniformity and permanence of the lacings, and more particularly of the fastenings or knots holding the lacings in place.

Figure 1:
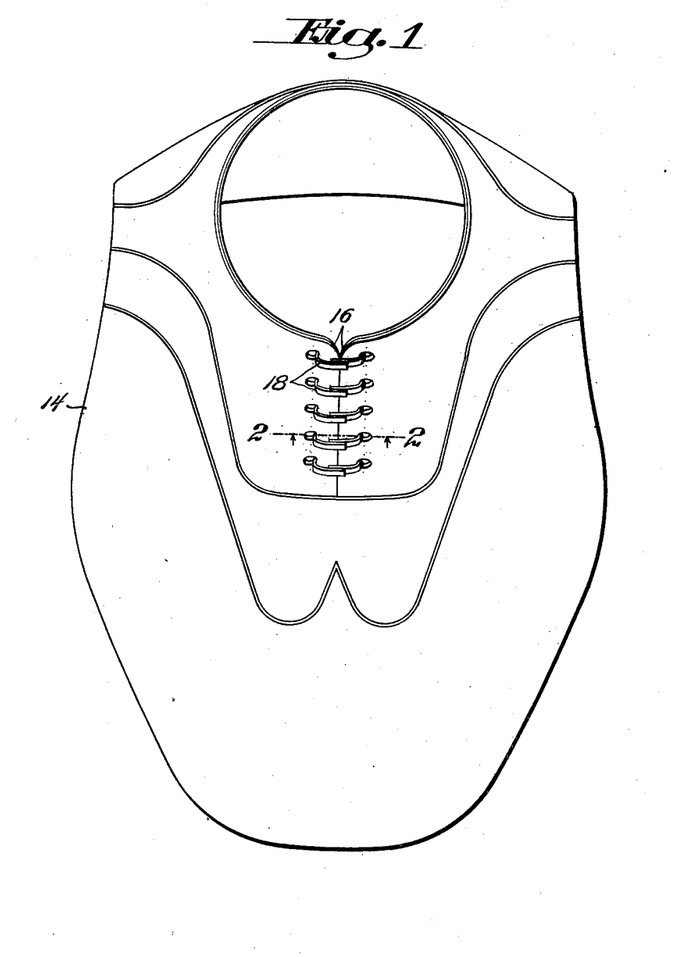
Fig. 1 is a somewhat diagrammatic view of a shoe upper shown in an opened-out position and with the lacing of the present invention inserted therein.
Figure 2:
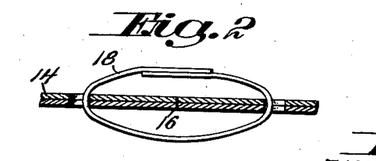
Fig. 2 is a detail sectional view taken on the line 2—2 of Fig. 1 on an enlarged scale to illustrate particularly one of the lacing bands.

The lacing illustrated in Figs. 1 and 2 for connecting together the several eyelet pairs manufactured in accordance with the present invention, comprises a series of endless bands formed of a deformable organic plastic material having latent adhesive qualities so that the two ends of each lacing band may be readily connected together by activation of the material to form a continuous integral band for lasting purposes. In the illustrated form of the invention, the plastic material employed is a polymerized vinyledine chloride known as Saran. This material is supplied in strip form. In the preferred form of the invention, this strip material may be somewhat less than 1/8 of an inch in width, and approximately 3/32 of an inch in thickness. The material in this form is tough and somewhat stiff in quality, is of a smooth, somewhat oily texture, and is capable of being bent as required for the insertion of the lacing strip through the eyelets, and the subsequent formation of the lacing band. This material further is thermo-plastic, having latent adhesive qualities which are rendered active by the activation of the material to seal the ends of a strip together. The material is readily fusable to seal the ends of the lacing band together by application of heat and pressure in moderate amounts.

Figs. 1 and 2 of the drawings, illustrate a laced shoe upper which embodies in a preferred form the several features of the improved lace of the present invention. The shoe upper designated at 14 in Fig. 1 is shown in the opened-out position in which it would be held for fitting and stretching over the last. The edges 16 of the eyelet slit are held together by a series of lacings which are formed in accordance with the invention, and comprise a series of endless bands 18, each of which passes through the eyelets of a pair. The laces are formed of the polymerized vinyledine chloride above described.

An element of the invention consists in the discovery that a particular class of materials generally described as organic thermo-plastic materials is particularly adapted when supplied in strip form to form temporary lacings for holding together the eyelet edges of the shoe upper during the several manufacturing operations upon the shoe when the shoe is supported on a last. Specifically, the invention involves the selection from this general class of thermo-plastic materials, of such a material which in the strip form will have certain qualities which are of particular value and are necessary in carrying out the present invention. A material of this general class which will be suitable for use in accordance with the present invention, is described as having in the strip form, qualities of stiffness, toughness, flexibility, a smooth almost oily texture of surface, and a latent adhesive quality which is rendered active by activation of the material to adhere portions of the material together to form a connected homogeneous mass. The lacing strip formed from a material selected for these qualities should be of sufficient stiffness to maintain the shape impressed upon it to facilitate the penetration of the lacing strip through the eyelets, and the closing of the ends to form a closed band through the eyelets of the pair. Another necessary quality of the selected material is a sufficient degree of flexibility and toughness so that the material may be bent or deformed without any appreciable loss of strength, and so that the lacings formed from this material may be of sufficient strength to readily withstand the tensioning strains incidental to the stretching of the upper over a last as well as other usual shoe manufacturing operations. A further quality which differentiates the selected material from those previously available in the art, and which has been found to be of particular value, is the smooth, frictionless texture of the surface of the material which has no tendency to mark or to mar the leather through which the lacing is passed. The latent adhesive quality of the thermo-plastic material which is rendered active by the application of heat and pressure in moderate amounts to adhere the ends of the lacing strip together, provides a simple, inexpensive and at the same time a most efficient means of securing together the ends of the lacing strips to form unitary lacing bands of predetermined length, and without such risk of injury to or marring of the upper as might result, for example, from attempts at welding or soldering together the ends of a metallic strip. The bands thus formed in accordance with the present invention, are of homogeneous material having a uniformly high tensile strength around the entire length of the band.

Within the scope of the invention, it is contemplated that a thermo-plastic material having the necessary qualities may be selected from a relatively large group of such materials which may be of substantially different types. Materials of this general character which may be successfully employed will include in addition to the polymerized vinylidine chloride above described, plastic materials of the copolymer vinyl type, materials of the amide or protein type such as Nylon, and also certain cellulosic materials including cellulose acetate, cellulose acetate butyrate, and ethyl cellulose, styrene in the extruded form when properly oriented, and rubber hydrochloride. It will be understood that the listing of thermo-plastic materials above given is intended to be representative only, and that thermo-plastic materials of still other description may be found having the requisite qualities of toughness, stiffness and capability of being bent which will adapt such materials for use in accordance with the present invention.

The method employed for producing the laced shoe upper above described in accordance with the present invention, consists first in the selection of an organic thermo-plastic material having the qualities above described including those qualities of stiffness, tensile strength, toughness, flexibility or capability of being bent, and a latent adhesive quality which is rendered active by activation of the material to fuse or adhere the strip ends of the plastic material together. In the preferred form of the method, a thermoplastic material is employed which is activated by the application of heat and pressure in moderate amounts to fuse or seal together the ends of each lacing band. The plastic material selected is supplied in strip form, is cut to the desired length, and is supported and shaped or bent in such a manner as to facilitate the impaling of the eyelets of the pair thereon. In the preferred form of the invention, the central portion of each strip is held in a clamping device, and the two ends are bent upwardly to permit opposite eyelets of the upper while held in an opened-out position to be impaled simultaneously thereon. The upper is presented by the operator to cause the eyelets of the respective pairs to be impaled upon the upturned ends of the lacing strips. The ends of the lacing strips are then further bent into a closed position, and are sealed together with the application of heat in a moderate amount to form the completed lacing.

In the preferred form of the method illustrated, it is proposed to supply simultaneously a number of lacing strip portions corresponding with the number of lacings to be inserted in the shoe upper, to support each of the several strip portions in a predetermined position in accordance with the spacing of the eyelet pairs from one another, to bend the ends of these strip portions upwardly in a spaced relation from one another to permit the impaling of the eyelets of the several pairs thereon in a single operation, and thereafter to bend over and seal together the ends of the lacing strips again in a simultaneous movement to form the completed lacings.

In accordance with the invention, a new machine is provided which is particularly adapted for use in the lacing of shoe uppers in accordance with applicant's improved method. Referring specifically to the drawings, the machine comprises a base 20 on which is mounted a work table 22, a lacing strip supply assembly including end bearing brackets 24 and a pivot rod 26 on which is supported a series of reels 28 for the lacing strip material, a guideway for the strip material comprising a pair of plates 30 superimposed one on the other extending from the reels 28 to the table 22 and slotted to provide feed channels 32, a feed device comprising a slidably supported frame 34 having feed fingers 36 arranged for reciprocating movement along the guideway, and a strip closing and sealing device comprising overarm brackets 38 and 39, a pivot shaft 40 and a depending lace closing member 42 and a lace closing and sealing member 44 carried thereby. The machine is further provided with a lacing strip severing device comprising a knife 46 and a series of pivotally mounted bending members 58 on the work table 22 for severing the lacing strip portions from the supply and for bending the severed portions so that their ends extend vertically upwardly to facilitate the impaling of the eyelets of the upper thereon.

Figure 3:
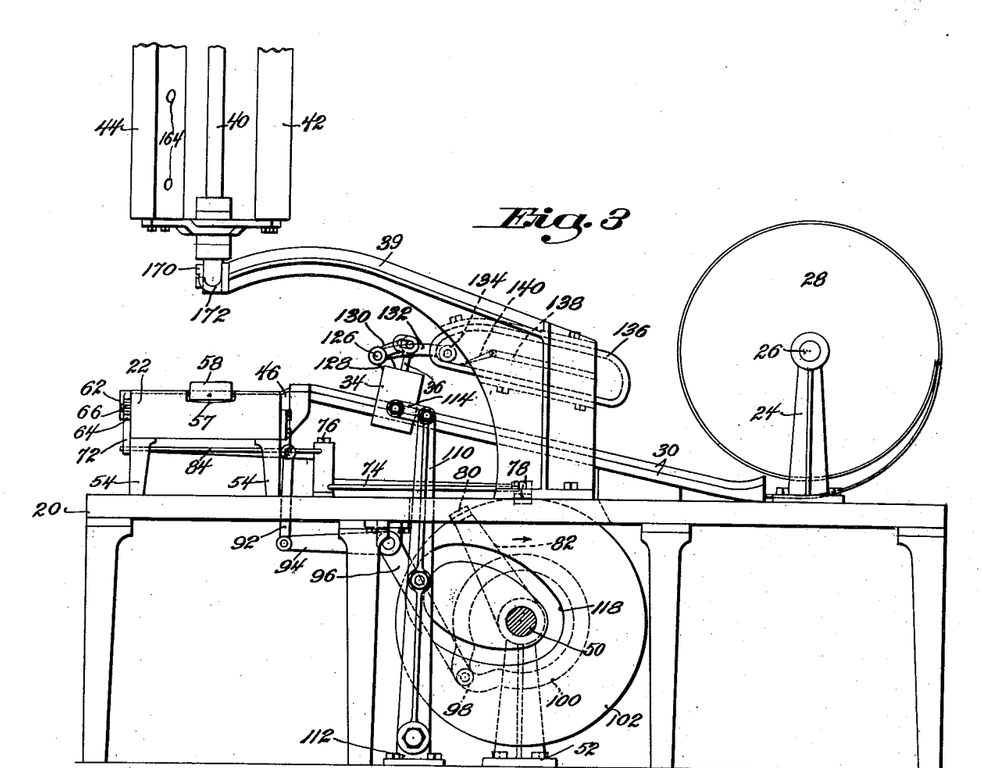
Fig. 3 is a view in side elevation of applicant's machine for inserting lacings of deformable plastic strip material in an upper in accordance with the invention, the machine being shown in rest position and with the lace closing and sealing device swung upwardly to permit the placing of an upper onto the machine.
Figure 4:
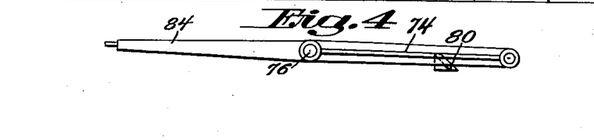
Fig. 4 is a detail plan view of a cam actuated lever for operating the forming device for bending the ends of the lacing strip portions upwardly to permit the impaling of the eyeletted upper thereon.
Figure 5:
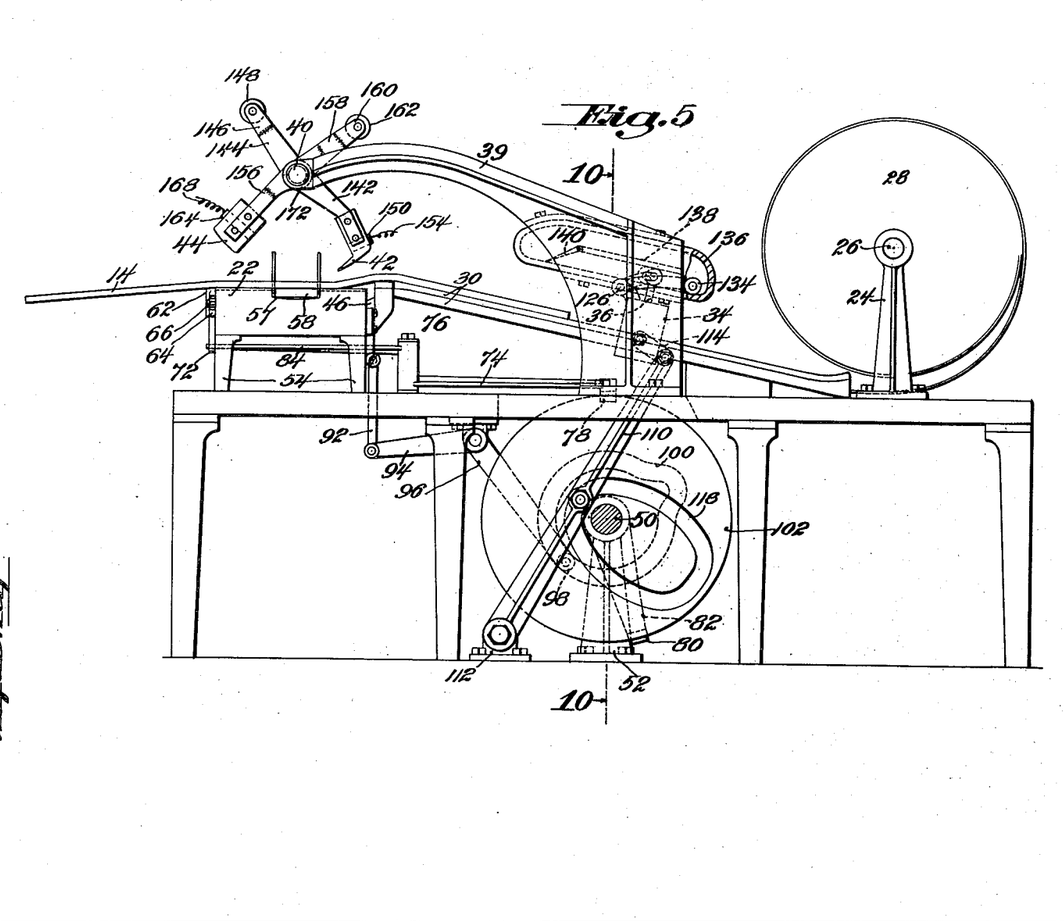
Fig. 5 is a side elevation of the machine similar to Fig. 3, but taken at a subsequent point of the lacing operation in which the ends of the lacing strips have been bent into an upright position, the upper has been impaled thereon, and the lace closing and sealing device has been swung downwardly to its operative position.
Figure 6:
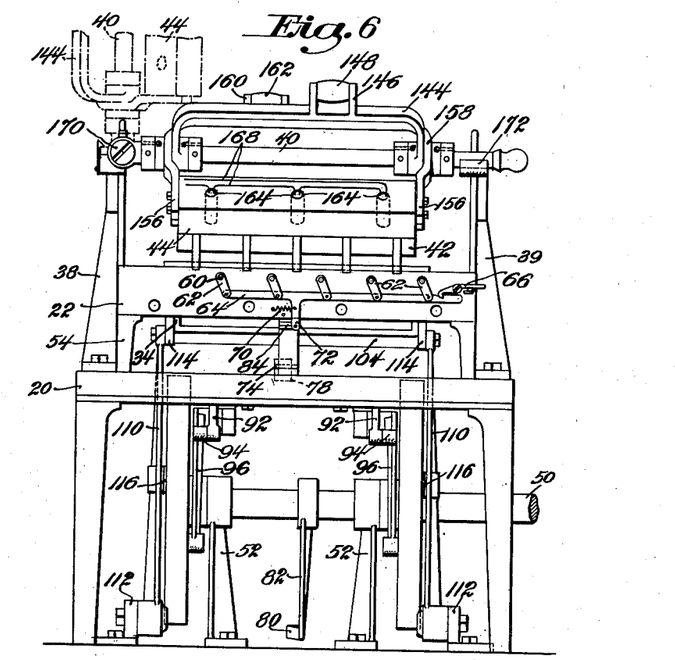
Fig. 6 is an end view of the machine looking from the left of the positions shown in Figs. 3 and 5, the parts being shown specifically in the position illustrated in Fig. 5, and with the raised position of the lace closing and sealing device indicated in dot-and-dash lines.

The operation of certain of these mechanisms including the mechanism for feeding the lacing strip portions into position on the work support, the severing knife 46 and the mechanism for clamping and for bending the lacing strip portions into eyelet receiving position, is effected mechanically through cam and follower connections from a cam shaft 50 which is supported with relation to the machine base in bearings formed in a pair of floor brackets 52 best shown in Figs. 3, 5 and 6. The cam and follower connections are constructed and arranged to cause the complete cycle of strip feeding, severing, bending and clamping operations to be effected within one revolution of the cam shaft. The cam shaft 50 may be driven from any convenient source of power or manually, and is preferably driven through a one revolution clutch (not shown) which may be of conventional type and operates when thrown into operation to drive the cam shaft through one revolution and thereafter to disengage the clutch.

The work support 22 takes the form of a heavy block which is raised somewhat above the base 20 on legs 54, and has formed in the top surface thereof a series of transversely extending lace receiving and guiding channels 56. A relatively wide, deep slot 57 extending longitudinally of the top surface of the table provides a relatively deep recess in the nature of a female die element in each lace receiving and guiding channel 56 into which is fitted a cooperating bending and clamping member 58 in the nature of a male die element, one such bending and clamping member being provided for each lace receiving channel 56. As best shown in Figs. 6 to 9 inclusive, each of the members 58 is secured to a rock shaft 60 journalled in the table top and having secured to the forward end thereof a downwardly extending lever arm 62. A tie rod 64 extending horizontally along the front side of the table is pivotally connected with each of the lever arms 62 so that longitudinal movement of the tie rod will cause all of the bending and clamping members 58 to be moved as a unit from the raised inoperative position of Fig. 8 to the depressed lace bending and clamping position of Fig. 7. A spring-pressed latch 66 on the table is arranged for engagement with a notch in the tie rod 64 to latch the tie rod 64 and clamping member 58 in the operative position shown in Fig. 7. These parts when released from the latch 66 are normally held in the inoperative position of Fig. 8 by means of a tension spring 70 connected to a depending arm 72 of the tie rod 64.

Figure 7:
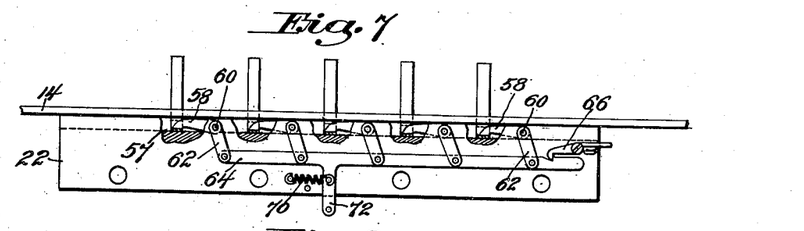
Figs. 7 and 8 illustrate two alternative positions of the bending device for bending the ends of the lacing strip portions into the upright position, Fig. 7 showing the bending arms in their depressed operative position, and Fig. 8 showing the bending arms in a relatively raised position to which these arms are returned to permit the removal of the laced upper from the machine, and the movement of new lengths of the lacing strips onto the work table.
Figure 8:
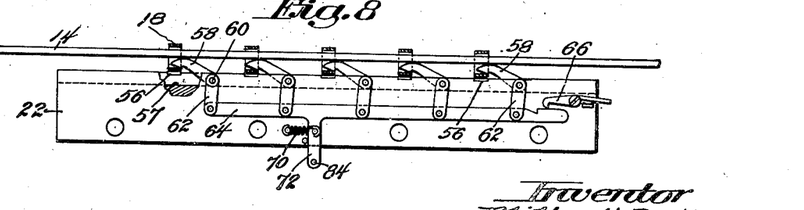
Figure 9:
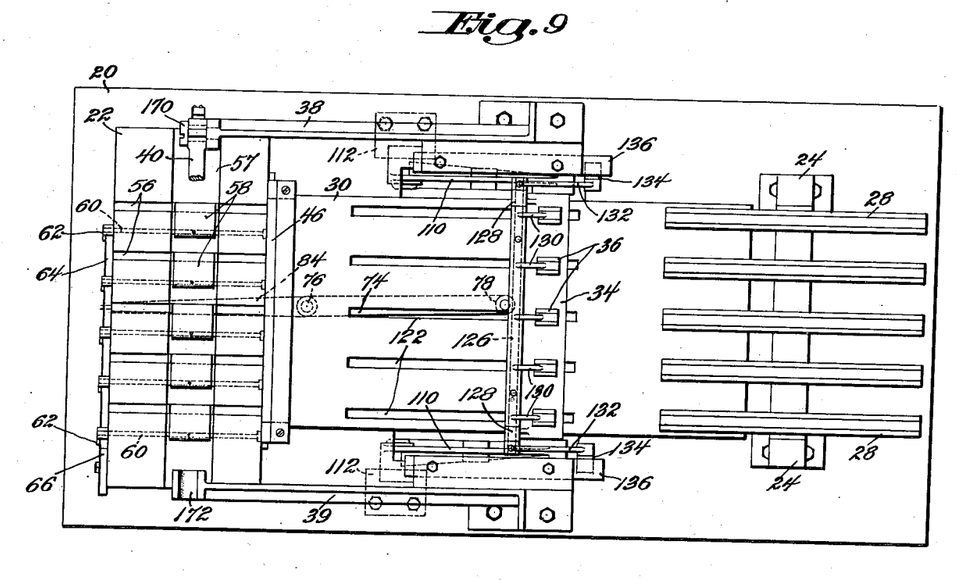
Fig. 9 is a plan view of the machine with the lace closing and sealing device broken away.

The lacing strip bending and clamping mechanism is shifted to the operative position of Fig. 7 by mechanical means which comprise a rearwardly extending cam lever 74 supported on a vertically arranged pivot pin 76. A follower roll 78 on the lever 74 is arranged to be engaged by a cam surface 80 on an arm 82 secured to the cam shaft 50. A forwardly extending arm 84 formed integrally with the sleeve hub of the cam lever 74 is connected with the depending arm 72 of the tie rod 64. Movement of the cam surface 80 into engagement with the roll 78 causes the cam lever 74 and arm 84 to be moved laterally to shift the tie rod 64 to the right against the pressure of spring 70 as shown in Fig. 7, where it is then held by the action of the latch 66. The downward movement of the bending and clamping levers 58 caused in this manner acts to force the middle sections of the lacing strips downwardly into the relatively deep central cutaway portions provided by the slot 57, so that the ends of the lacing strips are bent upwardly into a vertical eyelet receiving position. The U-shaped lacing strips are supported in the upright position by the members 58 which are held in the clamping position by the action of the latch 66.

The knife 46 for severing the individual lacing strips from the supply, as best shown in Figs. 3, 9, 11, 12 and 14, comprises a blade extending substantially the length of the table at its rear side and supported thereon for movement in a vertical plane by means of machine screws 88 screw-threaded into the work table and arranged to extend through slots 90 in the knife blade 46. The actuating mechanism for the knife comprises a pair of vertical links 92 connected at their upper ends to lugs formed on the blade 46 and at their lower ends to two parallel forwardly extending lever arms 94, each of which is formed with a downwardly extending arm 96 provided with a cam follower roll 98 for engagement in identical cam tracks 100 formed respectively on the inside faces of two identical cam disks 102 carried on the cam shaft 50.

The illustrated machine is provided with a feed mechanism which is arranged to be operated mechanically from the cam shaft 50 for advancing the lacing strips simultaneously from the supply (see Figs. 3, 5, 9, 10, 12 and 14). Of this mechanism the feed frame 34 previously referred to, comprises a laterally extending strap 104 passing beneath the guideway 30, a parallel strap 106 extending across the guideway and resting thereon, and a third parallel strap 108 spaced above the strap 106 and journalled to receive the shank portions of the feed fingers 36. The parallel straps 104, 106 and 108 are connected together by vertically extending end pieces at each end thereof to form a rigid structure. The feed device comprising the frame 34 is arranged to be moved from the normal retracted position shown in Fig. 14 to a fully advanced position shown in Fig. 12 to feed the portions of the strip material into position for lacing the shoe upper, and is then returned to the starting position. These operations are controlled from the cam shaft 50 through connections which comprise a pair of vertically arranged cam levers 110 which are supported at their lower ends in floor brackets 112, and are connected at their upper ends by means of links 114 with the two ends of the frame 34. The cam levers 110 are provided intermediate their ends with cam follower rolls 116 which engage respectively in identical cam groves 118 formed in the outer faces of the cam disks 102.

Each of the feed fingers 36 takes the form of a plunger which is spring-pressed downwardly by means of a compression spring 120 engaging at one end against an enlarged lower end portion of the plunger, and at its upper end against the strap 108 of the feed frame 34. The feed fingers 36 are arranged to extend downwardly through vertical slots 122 formed in the guideway 30, and cooperate with relatively fixed gripping members comprising posts 124 which are formed in the under plate 104 of the feed 34 and extend upwardly into the slots 122 from beneath, so that the strip material may be firmly gripped for feeding between the members 124 and fingers 36.

Figure 10:
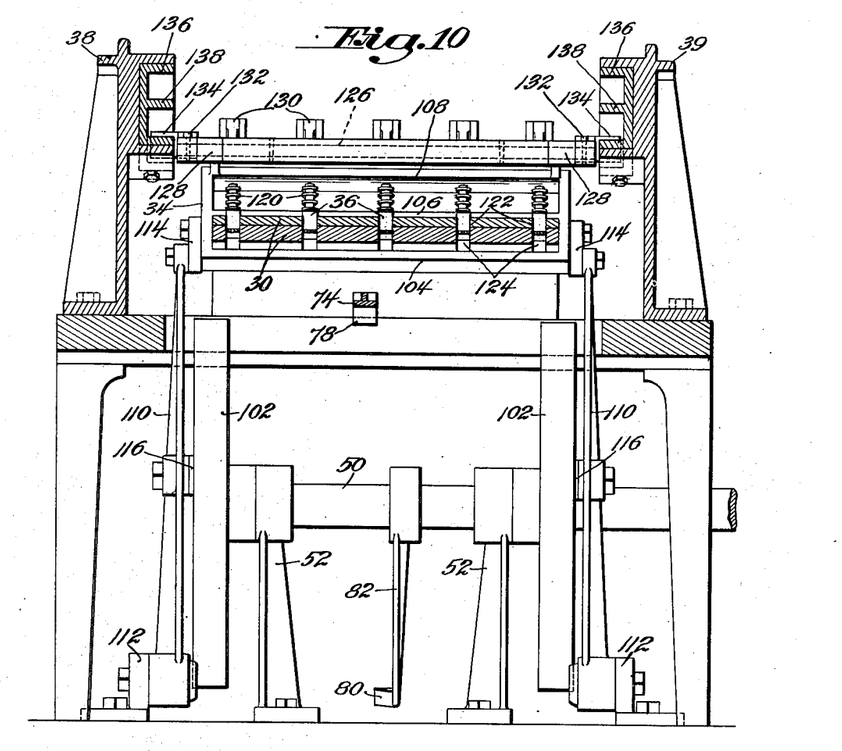
Fig. 10 is a sectional view taken on the line 10—10 of Fig. 5, illustrating particularly the mechanism for advancing successive lengths of the strip material onto the work table, the main cam shaft and the several operating cams of the machine.
Figure 11:
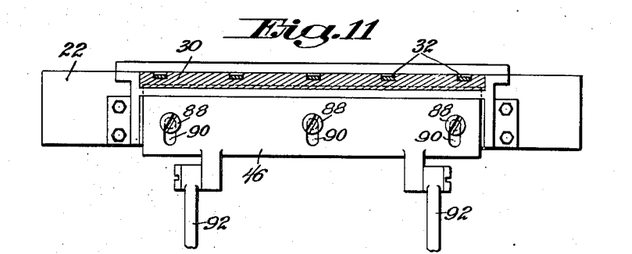
Fig. 11 is a detail sectional view on an enlarged scale of the knife mechanism for severing of the desired length of the lacing material from the strip preparatory for the preliminary bending operation thereon.
Figures 12, 13, 14, 15, 16, 17:
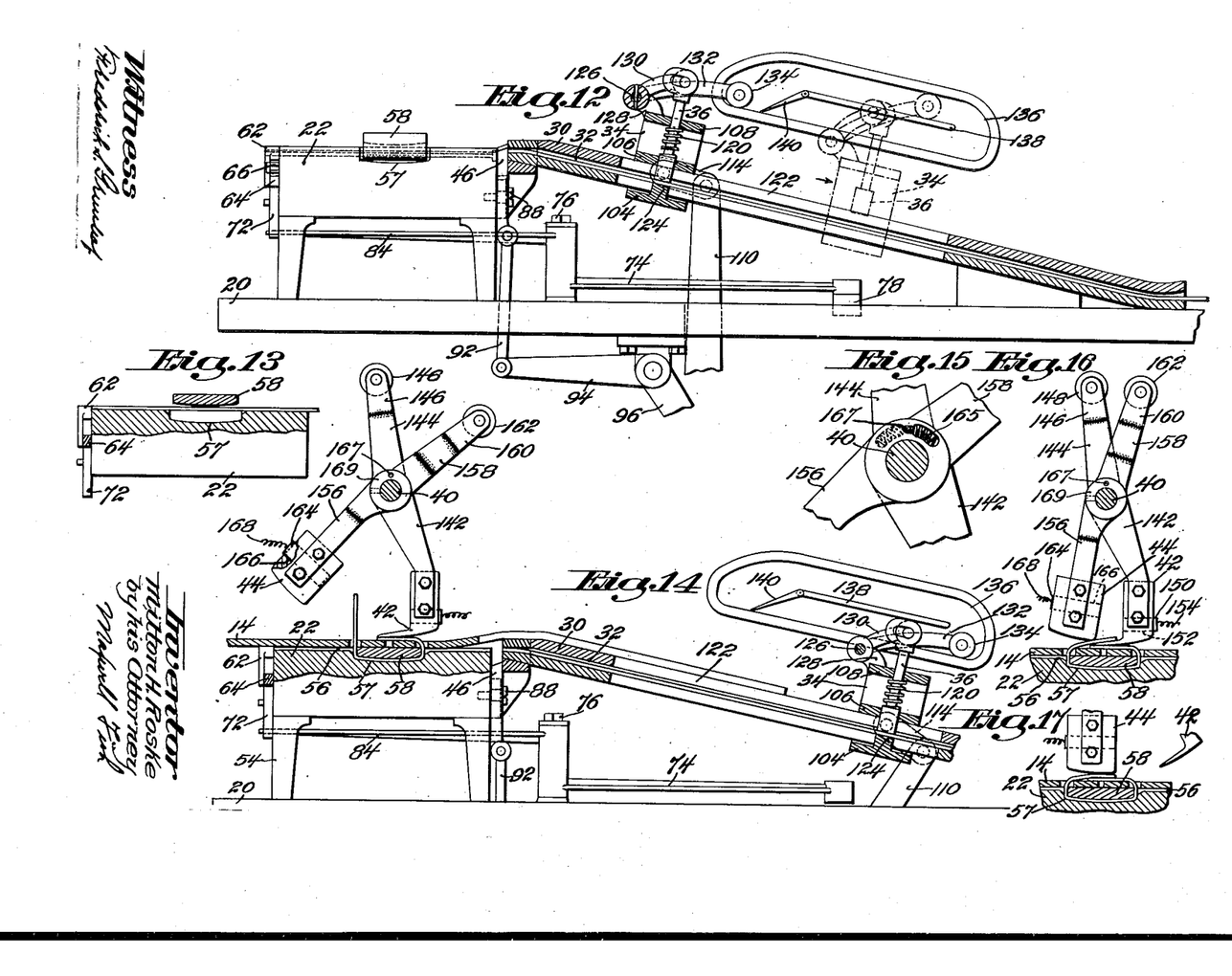
Fig. 12 is an enlarged detail view partly in section, illustrating particularly the feed mechanism and the mechanism for bending the ends of the lacing strip portions, the feed mechanism being shown at its extreme forward position at the end of the strip feeding movement.
Fig. 13 is a detail view of the work table with the upper portion thereof broken away and sectioned to illustrate the relative positions of the lacing strip, bending lever and angle forming recess prior to the preliminary bending operation.
Fig. 14 is a detail view of the feed mechanism with portions broken away and sectioned to illustrate underlying parts, where in the position shown the feed mechanism is retracted and the bending member is moved downwardly to engage with and bend over one of the upstanding ends of the lacing strip shown in Fig. 5.
Fig. 15 is an enlarged detail sectional view illustrating particularly the spring connection between one of the supporting levers for the lace closing and sealing device and a fixed washer tending normally to maintain these levers in their opened-out position.
Fig. 16 is a detail sectional view showing the elements of the lace closing and sealing device in their position taken nearly at the end of the operation in which the ironing member is moved into engagement with the superimposed ends of the lacing strip and the closing member cooperating therewith is about to be withdrawn.
Fig. 17 is a view similar to Fig. 16, but illustrating the position taken by the elements of the lace closing and sealing device at that point at which the lacing strip is being pressed or sealed into an endless band.

Mechanism is provided for controlling the operation of the fingers 36 to cause these fingers to be moved simultaneously to a raised inoperative position during the retracting movement of the feed frame 34, and to be moved downwardly to an engaging position prior to the start of the advancing movement of the feed frame. This mechanism comprises a rock shaft 126 which extends along the length of the feed frame 34 at its upper edge and is supported thereon in bearing brackets 128. The shaft 126 has rigidly secured thereto a series of lever arms 130 which are connected through pin and slot connections with the shank portions of the feed fingers 36. Identical cam levers 132 are rigidly secured to the opposite ends of the rock shaft 126, and are provided with follower rolls 134 engaging respectively with switch cam tracks 136 provided in the overarm brackets 38 and 39. As best shown in Figs. 10, 12 and 14 of the drawings, the switch cam tracks 136 are complementary to one another, each being provided with a central vane 138 having at its forward end a pivoted switch cam member 140. The vane 138 associated with each switch cam track is made sufficiently short so that for the fully retracted position illustrated in Fig. 14, the follower rollers 134 and feed fingers 36 are free to move to the low strip engaging position under the influence of the tension springs 120. During the subsequent advancing or feeding movement of the feed frame 34, the follower rolls 134 will ride beneath the vanes 138 and then out from under the switch cam members 140 to the fully advanced position shown in Fig. 12. Upon the start of the retracting movement of the feed frame the follower rolls 134 will ride upwardly on the switch cam members 140, and will then be retained in this raised position in which the feed fingers 36 are disengaged from the lacing strips until the feed frame 34 is returned to its starting position. The relation of the parts during the return movement of the feed frame 34 is indicated in Fig. 12 in dot-and-dash lines.

The mechanism provided with the present machine for closing and for sealing together the ends of the lacing strips to form the completed lacings, comprises the lace closing member 42 and the lace closing and sealing member 44 above referred to. The lace closing member 42 is a heavy rod-like member having a forwardly projecting wedge-shaped lower edge, and is supported and arranged for movement across the line of supported U-shaped lacing strips and the shoe upper impaled thereon to engage with and bend downwardly one side of each of the several strips. The member 42 is supported at opposite ends on lever arms 142 which form part of a U-shaped frame 144 supported to turn on the pivot shaft 40. Along its upper edge the frame 144 is provided with two upwardly extending lugs 146 which provide support for a manually operable roller handle 148. The member 42 is particularly constructed and arranged for applying the heat to the contact surfaces of the lacing strips in order to activate the thermo-plastic strip material so that the two ends of the strip may be readily fused together. Heat is supplied to the forwardly projecting wedge-shaped lower edge of the member 42 by means of three small heating units in the form of cartridges 150 which are mounted in drills 152 in the bar 42, and are connected by lead wires 154 with any convenient source of electrical supply.

The lace closing and sealing member 44 is similarly supported on downwardly extending arms 156 of a U-shaped frame 158 pivotally mounted on the pivot shaft 40. The frame 158 is provided along its upper edge with two upwardly extending lugs 160 which provide support for a manually operable roller handle 162. The member 44 is heated by means of three small heating units in the form of cartridges 164 which are mounted in drills 166 in the bar 44, and are connected by lead wires 168 with the source of electrical supply. A compression spring 165 (see Figs. 14 and 15) seated in a recess in the hub of the frame 158 for engagement with a pin 167 projecting from a washer 169 fixed on the shaft 40 acts to hold the frame 158 and closing and sealing member 44 normally in the open position. The frame 144 is held in its open position by a similar pin and spring connection connecting the hub of the frame 144 with a fixed collar adjacent thereto on the shaft 40 as indicated in dotted lines in Figs. 6 and 15.

As best shown in Figs. 3 and 6 of the drawings, the pivot shaft 40 is carried on a pivotal mounting 170 in the overarm bracket 38, and is supported adjacent its opposite end in a semi-cylindrical bearing member 172 in the overarm bracket 39, so that the lace closing and sealing assembly may be readily moved on the pivotal mounting 170 to a vertical position to permit the positioning of the upper on the work support and the impaling of the eyelets upon the upwardly extending legs of the respective lacing strips, and again to permit the subsequent removal of the completely laced upper from the machine.

The operation of the machine above described for lacing a shoe upper in accordance with applicant's improved method, will be briefly described as follows. In the starting position of the machine, the cam shaft 50 will be in the position shown in Fig. 5, in which the feed frame 34 is in its fully retracted position, the knife 46 is retracted and the operating cam 80 for the lacing strip bending and clamping mechanism is at the bottom of its periphery. For the starting position of the machine, it is assumed also that the strip bending and clamping members 58 have been released and permitted to move upwardly by the tripping of the manually operable latch 66, and that the lace closing and sealing device comprising pivot shaft 40, the lace closing member 42 and the lace closing and sealing member 44 have been moved to their fully raised inoperative position as shown in Fig. 3.

In the operation of the machine, the cam shaft 50 is now rotated through one revolution preferably by the operation of a one revolution clutch to effect the simultaneous feeding of the several strips of plastic material, so that portions thereof extend entirely across the work support 22 in the lacing strip receiving channels 56, to sever these strip portions from the supply, and to bend or shape the severed lacing strips thus formed into the U-shape shown in Fig. 5, in which position they are held by the clamping action of the shaping and clamping members 58 clamped in position by the operation of latch 66. As previously stated, the feed fingers of the feed device will be in their low clamping position for the starting position of the machine shown in Fig. 5. Rotation of the cam shaft 50 through substantially one-half revolution from the position shown in Fig. 5 to that shown in Fig. 3, causes the feed frame 34 to be advanced to position portions of the strip material across the work support 22, and at the completion of this feeding movement causes the knife 46 to move to the raised position of Fig. 3 to sever these strip portions from the supply. Continued rotation of the cam shaft from the position shown in Fig. 3, now causes the cam 80 to be brought into engagement with the follower roll 78 to move the tie rod 64 from the inoperative position shown in Fig. 8 rightwardly to the lace shaping and clamping position of Fig. 7, so that the lacing strips thus cut off are bent into a U-shape and are firmly held in this clamping position by engagement of the latch 66 with tie rod 64. During the second half of the revolution of the cam shaft 50, the knife 46 is withdrawn and the feed frame 34 is returned to its retracted starting position. During this retracting movement of the feed frame, the follower rolls 134 ride upwardly on the switch cam members 140 to disengage the feed fingers 36, and are thereafter held in the raised position against the pressure of springs 120 by engagement with the vanes 138 until the follower rolls 134 have moved clear of the vanes 138 as the feed frame 34 reaches its fully retracted position.

The operator next places the shoe upper to be laced in an opened-out position on the work support, so that the eyelets of the several pairs are impaled upon the upwardly extending legs of the U-shaped lacing strips held rigidly in position on the support by the lace shaping and clamping members 58.

The operator will next move the lace closing and sealing device downwardly from the dotted line position to the full line position shown in Figs. 5 and 6 preparatory to the closing and sealing of the ends of the lacing strips into the form of closed bands. The lace closing member 42 and lace closing and sealing member 44 are in their fully separated or retracted position. The operator now moves the handle 148 so that the lace closing member 42 is moved forwardly to engage with and bend downwardly the rear legs of the laces as shown in Fig. 14. The operator then moves the handle 162 forwardly toward the handle 148 so that the lace closing and sealing member 44 is caused to engage with and bend downwardly the forward legs of the laces as shown in Fig. 16. As shown in this figure, the forward leg of the lace is folded to overlie the top of the edge of the lace closing member 42. Continued forward movement of the handle 162 which now carries with it the handle 148 causes the lace closing member 42 to be withdrawn and the lace closing and sealing member 44 to be moved rearwardly to press together and to fuse the ends of each lace to form the completed laces. To remove the laced shoe upper from the machine, the operator swings the lace closing and sealing device out of the way and trips the latch 66 to release the clamping members 58 so that the laces can be readily withdrawn from beneath these members.

The invention having been described, what is claimed is:

1. A machine for placing in a shoe upper, lacings comprised of a length of deformable organic thermoplastic material adapted for having their ends fused together to form continuous integral bands, which comprises means for supporting a length of said material so that the eyelets of an eyeletted upper may be placed thereon, means for bringing together and for pressing together the end portions of said length passing through the respective eyelets, and means to supply heat to said engaged end portions to bond said material.

2. A machine for placing in a shoe upper, lacings comprised of a length of deformable organic thermoplastic material adapted for having the ends thereof bonded together with the application of a moderate amount of heat and pressure having, in combination, a work supporting table, means on the table for supporting one or more lengths of said material so that the eyelets of an eyeletted upper may be placed thereon, means for bringing together and for pressing together the end portions of said length, and means for supplying heat to said engaged ends portions in sufficient quantity to bond said material.

3. A machine for placing in a shoe upper, lacings comprised of lengths of a deformable organic thermoplastic material adapted for having the ends thereof bonded together with the moderate application of heat and pressure having, in combination, means for bending the ends of a length of strip lacing material upwardly and for clamping the middle portion of said strip firmly so that the eyelets of an eyeletted upper may be presented thereto, mechanism for bending against one another and for pressing together the end portions of said length passing through the eyelets of the upper, and means for heating said engaged end portions to form a continuous integral band.

4. A machine for placing in a shoe upper, lacings comprised of lengths of deformable organic thermoplastic material adapted for having the ends thereof bonded together with a moderate application of heat and pressure having, in combination, means for supporting one or more lengths of said material in spaced relation with the ends thereof in position for the impaling of the eyelets of each pair along the lengths of said material, and a device for bending and bonding together the ends of said length including means for pressing the ends together and for supplying heat to adhere the engaged ends.

5. A machine for placing in a shoe upper, lacings comprised of lengths of deformable organic thermoplastic material adapted for having their ends bonded together with a moderate application of heat and pressure to form continuous integral bands having, in combination, a work supporting table, lacing strip guiding grooves on the table, bending and clamping means for bending to a U-shape and for clamping the bent strips in eyelet receiving position on the table, and lace closing and bonding means supported with relation to the table including means for closing and for pressing together the ends of the strips, and means to heat the closed ends.

6. A machine for placing in a shoe upper, lacings comprised of lengths of deformable organic thermoplastic material adapted for having their ends bonded together with a moderate application of heat and pressure to form continuous integral bands having, in combination, a work supporting table, means for locating the lacing strip lengths of said material on the table, bending and clamping devices on the table including shaping surfaces, and movable shaping and clamping members cooperating therewith for bending to a U shape and for clamping each lacing strip length with its ends in upstanding position, and a strip closing and sealing device comprising cooperating members for engaging with and pressing together the ends of said clamped lacing strip lengths, and means for supplying heat for bonding said ends together.

7. A machine for lacing shoe uppers having, in combination, a work supporting table, locating grooves for lengths of organic thermo-plastic strip material across said table, supply means including a connecting guideway and feeding means for feeding the strip material into said grooves, means for severing lengths of said strip material in the grooves from the supply, bending and clamping means including shape forming surfaces and bending and clamping members cooperating therewith movable on the support to bend to a U-shape and to clamp said U-shaped lengths in eyelet receiving position, and a lace closing and sealing mechanism including means for supplying heat supported with relation to the table, and means for pressing together the upwardly extending ends of said U-shaped lacing strip lengths to form continuous unitary bands in the presence of heat.

8. A machine for lacing shoe uppers having, in combination, a work supporting table, locating grooves for lengths of organic thermo-plastic strip material across said table, supply means including a connecting guideway and feeding means for feeding the strip material to said grooves, means for severing lengths of said strip material in the grooves from the supply, bending and clamping means including shaping surfaces and bending and clamping members cooperating therewith movable on the support to bend to a U-shape and to clamp said U-shaped lengths with their ends in upwardly extending position, pattern means for actuating said feeding means, severing means, and bending and clamping means in timed relation, and a lace closing and bonding mechanism including a device for supplying heat supported with relation to the table, and means for pressing together the upwardly extending ends of said U-shaped lacing strip lengths in the presence of heat to form continuous unitary bands.

9. A machine for lacing shoe uppers having, in combination, a work supporting table, locating grooves for lengths of strip material across said table, supply means including a connecting guideway and feeding means for feeding the strip material to said grooves, means for severing lengths of said strip material in the grooves from the supply, bending and clamping means including bending and clamping members movable on the support to bend to a U-shape and to clamp said U-shaped lengths with their ends in upwardly extending position, a cam shaft, and cam and follower connections rendered operative by the rotation of said shaft for actuating said feeding means, said strip severing means and said lacing strip length bending and clamping means, and a lace closing mechanism supported with relation to the table for bending together the upwardly extending ends of said U-shaped lacing strip lengths.

10. A machine for lacing shoe uppers having, in combination, a work supporting table, locating grooves for lengths of strip material across said table, supply means including a guideway connecting with said grooves, a feed device comprising a feed frame, means for imparting a feeding and return movement to the frame, feed fingers in the frame for engaging the lacing strips, and means operative during the feeding movement of the frame to engage the fingers with the strips, and during the return movement of the frame to disengage the fingers from the strips, means for severing the lengths of the strip material in the grooves from the supply, bending and clamping means on the table for positioning said lengths with their ends in upwardly extending position, and a lace closing mechanism supported with relation to the table for bending together the ends of the strip lengths.

11. A machine for lacing shoe uppers having, in combination, a work supporting table, locating grooves for lengths of strip material across said table, supply means including a guideway connecting with said grooves, a feed device comprising a frame, and means for imparting advancing and retracting movements to the frame, feed fingers in the frame for engaging the lacing strips, actuating means for moving the fingers simultaneously between engaging and inoperative positions including a switch cam and follower connection operative during the retracting movement of the frame to move the fingers to the inoperative position, means for severing the lengths of the strip material in the grooves from the supply, bending and clamping means on the table for positioning said lengths with their ends in upwardly extending position, and a lace closing mechanism supported with relation to the table comprising means for bending together the ends of the strip lengths.

12. A machine for lacing eyeletted shoe uppers having, in combination, a work supporting table, lacing strip positioning surfaces on the table, bending and clamping means cooperating with said surfaces for bending to a U-shape and for clamping the bent strips with their ends in upwardly extending position on the table, and lace closing means supported with relation to the table for closing the ends of the strip comprising a closing member having a wedge-shaped edge movable across the eyelet pairs, a cooperating closing and pressing member movable toward said first-mentioned closing member to bend to a closed position and to press together the ends of the strips.

13. A machine for lacing eyeletted shoe uppers having, in combination, a work supporting table, means on the table for bending to a U-shape and for supporting on the table the U-shaped lengths of lacing strip with their ends in upstanding position thereon, and mechanism cooperating with said supporting means for bending together and for heating the ends of the length of material which comprises a closing member having a wedge-shaped edge for engagement between the surfaces of the lacing strip to be contacted with one another, a cooperating member, supporting means on which said members are movable toward one another across the eyelet pairs for bending and for pressing together the ends of the strip, and heating units distributed through each of said closing member and cooperating member for applying heat in moderate amounts.

14. A machine for lacing shoe uppers having, in combination, a work supporting table, locating grooves for lengths of organic thermoplastic strip material across said table providing lace clamping and positioning surfaces, clamping elements cooperating with said surfaces to deform and to position the ends of said strips upwardly to receive the eyelets of the eyeletted upper thereon, and cooperating members movable to bend and to press together the ends of the supported strips.

15. A machine for lacing shoe uppers having, in combination, a work supporting table, locating grooves for lengths of organic thermoplastic strip material across said table providing lace clamping and positioning surfaces, clamping elements cooperating with said surfaces, means to simultaneously actuate said elements to bend to a U-shape and to clamp said strip lengths in spaced relation to receive the eyeletted upper thereon, and cooperating members movable to simultaneously bend and to press together the ends of the several supported lacing strips.

16. A machine for lacing shoe uppers having, in combination, a work supporting table, locating grooves for lengths of organic thermoplastic strip material across said table providing lace clamping and positioning surfaces, clamping elements cooperating with said surfaces, means to simultaneously actuate said elements to bend to a U-shape and to clamp said strip lengths in space relation to receive the eyeletted upper thereon, and means for bending and pressing together the ends of the laces comprising a support pivotally mounted upon the base to overlie the upper and laces, and a pair of bending and press members pivoted thereon.

MILTON H. ROSKE.

REFERENCES CITED

The following references are of record in the file of this patent:

UNITED STATES PATENTS

| Number | Name | Date |
|---|---|---|
| 195,603 | Heyl | Sept. 25, 1877 |
| 218,143 | Shellenberger | Aug. 5, 1879 |
| 639,350 | Brown | Dec. 19, 1899 |
| 784,209 | Frantz | Mar. 7, 1905 |
| 920,293 | Ellis | May 4, 1909 |
| 990,242 | Ellis | Apr. 25, 1911 |
| 1,122,280 | Kempshall | Dec. 29, 1914 |
| 1,635,510 | Tevander | July 12, 1927 |
| 1,635,511 | Tevander | July 12, 1927 |
| 1,881,177 | Enslin | Oct. 4, 1932 |
| 1,986,356 | Palveki | Jan. 1, 1935 |
| 2,056,961 | Fossa et al. | Oct. 13, 1936 |
| 2,063,345 | Scott | Dec. 8, 1936 |
| 2,066,474 | Keaney | Jan. 5, 1937 |
| 2,082,125 | Schmidtke | June 1, 1937 |
| 2,223,017 | Abrams | Nov. 26, 1940 |
| 2,253,946 | Waters | Aug. 26, 1941 |
| 2,297,270 | Westerkamp | Sept. 29, 1942 |
| 2,356,109 | Wallace | Aug. 15, 1944 |

FOREIGN PATENTS

| Number | Country | Date |
|---|---|---|
| 5,043 | Great Britain | Feb. 27, 1913 |